US012011945B2

(12) United States Patent
Stewart

(10) Patent No.: US 12,011,945 B2
(45) Date of Patent: Jun. 18, 2024

(54) METHODS FOR DESIGNING AND PRODUCING A SECURITY FEATURE

(71) Applicant: Koenig & Bauer Banknote Solutions SA, Lausanne (CH)

(72) Inventor: Robert Laird Stewart, La Tour de Peilz (CH)

(73) Assignee: Koenig & Bauer Banknote Solutions SA, Lausanne (CH)

( * ) Notice: Subject to any disclaimer, the term of this patent is extended or adjusted under 35 U.S.C. 154(b) by 0 days.

(21) Appl. No.: 18/266,562

(22) PCT Filed: Dec. 14, 2021

(86) PCT No.: PCT/EP2021/085667
§ 371 (c)(1),
(2) Date: Jun. 9, 2023

(87) PCT Pub. No.: WO2022/129032
PCT Pub. Date: Jun. 23, 2022

(65) Prior Publication Data

US 2024/0051325 A1 Feb. 15, 2024

(30) Foreign Application Priority Data

Dec. 15, 2020 (GB) ...................................... 2019780

(51) Int. Cl.
*B42D 25/342* (2014.01)
*B42D 25/21* (2014.01)

(52) U.S. Cl.
CPC ........... *B42D 25/342* (2014.10); *B42D 25/21* (2014.10)

(58) Field of Classification Search
CPC .............................. B42D 25/342; B42D 25/21
(Continued)

(56) References Cited

U.S. PATENT DOCUMENTS 8,778,481 B2 7/2014 Kaule et al.
9,104,033 B2 8/2015 Lundvall
(Continued)

FOREIGN PATENT DOCUMENTS

GB 2554498 A 4/2018
JP 2003-226100 A 8/2003
(Continued)

OTHER PUBLICATIONS

PCT/EP2021/085667, Apr. 8, 2022, International Search Report and Written Opinion.
(Continued)

*Primary Examiner* — Justin V Lewis
(74) *Attorney, Agent, or Firm* — Wolf, Greenfield & Sacks, P.C.

(57) ABSTRACT

A method of designing at least an area of a printed image in a security feature is provided. The security feature comprises an array of optical elements overlaying the printed image. The method comprises designing an icon matrix comprising rows and columns of pixels having pixel values representing an icon to be viewed by a user of the security feature; determining a desired gap size to provide a desired magnification of the icon; generating an array of two dimensional matrices of pixels, wherein the array comprises a sequence of repeated sets of matrices, wherein each set comprises a first number of matrices of a first type having a first size and a second number of matrices of a second type having a second size, wherein the matrix of the first type and the matrix of the second type are based on the icon matrix, and wherein the first number, second number, first size, and second size are selected such that, the mean size of each matrix within the set deviates from the modal matrix size by the desired gap size. A printed image for a security feature is also provided.

27 Claims, 4 Drawing Sheets

(58) Field of Classification Search
USPC .............. 283/67, 70, 72, 74, 75, 94, 98, 901
See application file for complete search history.

(56) References Cited

U.S. PATENT DOCUMENTS

| | | | | |
|---|---|---|---|---|
| 2013/0056971 | A1 | 3/2013 | Holmes | |
| 2014/0063611 | A1 | 3/2014 | Raymond et al. | |
| 2015/0343830 | A1 * | 12/2015 | Raymond ............ | B42D 25/342 101/483 |
| 2019/0176507 | A1 | 6/2019 | Lister | |

FOREIGN PATENT DOCUMENTS

| | | | |
|---|---|---|---|
| JP | 2004-230561 | A | 8/2004 |
| JP | 2009-086041 | A | 4/2009 |
| JP | 2017-074791 | A | 4/2017 |
| JP | 2018-075838 | A | 5/2018 |
| WO | WO 2018/101881 | A1 | 6/2018 |
| WO | WO 2022/129032 | A1 | 6/2022 |

OTHER PUBLICATIONS

PCT/EP2021/085667, Jun. 29, 2023, International Preliminary Report on Patentability (Chapter 1).

GB 2019780.2, Jun. 8, 2021, Combined Search and Examination Report under Sections 17 and 18(3).

GB 2019780.2, Oct. 11, 2022, Examination Report under Section 18(2).

GB 2019780.2, Jul. 5, 2023, Examination Report under Section 18(3).

International Search Report and Written Opinion for International Application No. PCT/EP2021/085667 dated Apr. 8, 2022.

International Preliminary Report on Patentability (Chapter 1) for International Application No. PCT/EP2021/085667 dated Jun. 29, 2023.

Combined Search and Examination Report under Sections 17 and 18(3) for GB Application No. GB2019780.2 dated Jun. 8, 2021.

Examination Report under Section 18(3) for GB Application No. GB2019780.2 dated Oct. 11, 2022.

Examination Report under Section 18(3) for GB Application No. 2019780.2 dated Jul. 5, 2023.

Kamal et al., Properties of moire magnifiers. Opt Eng. Nov. 1, 1998;37(11):3007-14.

Intention to Grant under Section 18(4) for GB Application No. 2019780.2 dated Nov. 2, 2023.

* cited by examiner

METHODS FOR DESIGNING AND PRODUCING A SECURITY FEATURE

CROSS-REFERENCE TO RELATED APPLICATIONS

This application is a national stage filing under 35 U.S.C. § 371 of International Application No. PCT/EP2021/085667, filed Dec. 14, 2021, which claims the benefit of United Kingdom Application No. GB 2019780.2, filed Dec. 15, 2020, each of which is hereby incorporated herein by reference in its entirety.

FIELD OF THE INVENTION

Many documents contain security features that assist with identifying counterfeit or forged documents. Many of these documents will contain security features that utilise micro-optics as such features are typically difficult to copy with the precision needed to produce a convincing forgery.

The security features used in these documents often comprise an array of micro-optical elements overlaying a printed image made up of pixels. One such example of a security feature employing micro-optical elements is a moiré magnifier, where the printed image comprises a series of icons which are printed under approximately each lens of a micro-optic. Differences in the repeat length (pitch) of the icon and the lenses result in a mismatch which causes neighbouring lenses to magnify neighbouring parts of the icon, which in turn provides a magnified view of the icons to the viewer.

BACKGROUND

The present invention relates, generally, to the design of micro-optic based security features which are based on the principle of moiré magnification, which is described in detail in "Properties of moiré magnifiers" by Kamal et al. (Optical Engineering 37 (11) 3007-3014), the disclosure of which is incorporated by reference herein. A moiré magnifier based security feature of the prior art is illustrated in plan view in FIG. 1A and in cross-sectional side view in FIG. 1B. The security feature comprises a regular two dimensional array of substantially identical printed microimages, or icons 110. These icons might typically have dimensions up to about 250 μm. Generally, as illustrated in FIG. 1B, the printed icon is made up of a number of printed pixels 130. Each pixel has a pixel value (or values) dictating the colour of the icon at that point. A two dimensional array of micro-optical elements 120, for example, a two-dimensional array of microlenses, overlays the printed icons. The repeat length, or pitch 125, 126 of the optical elements is similar (but not identical) to the pitch 115, 116 of the printed icons. When viewed through the two dimensional array of optical elements, one or more magnified versions of the icon is generated. As will now be explained, the magnification differs depending on the extent to which the pitch of the array of icons and the pitch of the array of optical elements differ from each other. It will be noted that typically the pitch 125 of the optical elements and the pitch 115 of the printed icons in the horizontal direction will typically be the same as the respective pitch 126 of the optical elements and the pitch 116 of the printed icons in the vertical direction, although this need not be the case.

Generally, each optical element (e.g. microlens) will have identical optical properties. By providing a slight mismatch between the pitch of the icons and the pitch of the microlens array, each microlens will image a different part of the corresponding printed icon. In essence, successive optical elements image successive portions of the icon to build up a magnified image of the icon which will repeat every time the mismatch equals an integer number of lenses. The grey dashed box 150 in FIG. 1A indicates the repeat pattern, which defines the boundary at which the mismatch between the icons 110 and optical elements 120 has accumulated to the width of one micro-optical element 120. As a result of successive optical elements imaging successive portions of the icon, a magnified version of the icon 160 is visible to the viewer, as represented in FIG. 1C. As the viewer tilts the security feature, different parts of the icon will appear to be magnified by each of the lenses, with a result that the magnified icon appears to 'shift' with respect to the plane of the microlenses as the security feature is tilted. This in turn gives an impression of depth, with the magnified image of the icons appearing to lie on a different plane to the microlenses.

From the forgoing it is apparent that the degree of magnification in a moiré magnifier is dependent upon the degree of mismatch between the pitch of the optical elements and the pitch of the icons. As will now be explained with reference to a specific example, higher degrees of magnification are achieved as the pitch mismatch reduces.

Consider, for example, a security feature comprising icons having a width, $W_I$, of 70 μm, underlying an array of microlenses, each microlens having a width, $W_L$, of 70 μm, and arranged exactly adjacent to each other, i.e. having also having a pitch, $P_L$, of 70 μm. Now consider the resulting magnification if the pitch of the array of icons, $P_I$, is 72.5 μm, i.e. if each icon is spaced apart by $P_I - W_I = 2.5$ μm. Between adjacent microlenses, there is a change, Δ, in the offset between each microlens and its corresponding icon of $\Delta = P_I - P_L = P_I - W_I = 2.5$ μm. After 28 microlenses, the accumulated offset reaches $28\Delta = 70$ μm, which is the size of the icon. In effect, the next microlens (i.e. the 29th microlens) will thus image the same part of the icon as the first microlens. To the viewer, the icon is displayed across 28 microlenses, and so the magnification, M, is 28×.

The apparent size of the icon to the viewer is, $M \cdot W_I = 2870$ μm=1.96 mm. It will be appreciated that, because the apparent size of the icon is much larger than the size of the microlens through which it is viewed, it will give the appearance to the viewer that the icons are disposed on a virtual plane that appears to recede from the viewer, relative to the plane of the security feature.

As will be appreciated from the forgoing, the magnification, M is given by $M = P_I / \Delta$. Hence, greater apparent magnification (and also apparent separation between the virtual icon plane and the plane of the security feature) requires a smaller difference between the icon pitch and icon width, i.e. a smaller spacing between adjacent printed icons.

It will also be appreciated that by making the icon pitch smaller than the icon width, the sign of the magnification is reversed. Effectively, this gives the visual appearance of the icons being disposed on a virtual plane that appears to approach the viewer relative to the plane of the security feature.

It is known in the art to provide the required difference in pitch in different ways. For example, the difference in pitch can be achieved by printing the icons with an identical pitch to the lens array, but then rotating the lens array slightly relative to the underlying printed image. This gives rise to an effective reduction in the pitch of the lens array compared to the pitch of the underlying image. Alternatively, the pitch of the underlying printed image might be different to the pitch of the lens array, with the angular offset between the lens array and the printed image used to alter the effective difference in pitch between the icons and the lens array (and hence magnification). A problem in this method, however, is that the difference in pitch applied by the angular offset is necessarily constant across the security feature and it is therefore challenging to provide contrasting areas of magnification/apparent depth across the security feature. Moreover, it can be challenging to align the microlens array and the printed image with the required angular offset at the required degree of accuracy.

Another approach is to print the array of icons with a slight separation between each to increase their pitch relative to the lens pitch (as is illustrated in FIG. 1B). Taking the example above, the icon array could be printed with a 2.5 μm separation between each icon. Alternatively, the icons could be printed with a 2.5 μm reduction in spacing to provide a negative value for M. A problem in this method, however, is that it is limited by the accuracy of the printing process. Ultimately, the smallest difference in pitch that can be achieved is limited by the resolution of the printing process and, in the prior art, achieving high degrees of apparent magnification in physically thin security features requires a very high resolution printing process.

It is these and other problems that the present invention seeks to address.

SUMMARY OF THE INVENTION

One aspect of the invention provides a method of designing at least an area of a printed image in a security feature, the security feature comprising an array of optical elements overlaying the printed image, the method comprising: designing an icon matrix comprising rows and columns of pixels having pixel values representing an icon to be viewed by a user of the security feature; determining a desired gap size to provide a desired magnification of the icon; generating an array of two dimensional matrices of pixels, wherein the array comprises a sequence of repeated sets of matrices, wherein each set comprises a first number of matrices of a first type having a first size and a second number of matrices of a second type having a second size, wherein the matrix of the first type and the matrix of the second type are based on the icon matrix, and wherein the first number, second number, first size, and second size are selected such that, the mean size of each matrix within the set deviates from the modal matrix size by the desired gap size.

Advantageously, this allows for the effective mismatch between the icon pitch and the pitch of the overlaid optical elements to be controlled with a print process which has a more modest print resolution than was required in the prior art, and without the need to rotationally offset the optical elements with respect to the printed image. The magnification that can be achieved is no longer limited by the minimum print resolution or by the accuracy of rotational offset between the array of optical elements and the underlying image.

In one embodiment, the step of determining a desired gap dimension comprises calculating a gap size which would cause the desired magnification effect upon an array of repeated matrices corresponding to the icon matrix when the repeated matrices are spaced apart by said gap size and viewed via the array of optical elements.

In one embodiment, the matrix of the first type corresponds to the icon matrix.

That is to say, in this embodiment, the matrix of the first type might be the icon matrix, having the same dimensions as the icon matrix, whilst the matrix of the second type might be a modified version of the icon matrix such that it has a different size. For example, the pixel values of the matrix of the second type might correspond to an image which is a scaled version of the icon matrix, being either larger or smaller than the icon matrix. Alternatively, the matrix of the second type may be a cropped version of the icon matrix, that is to say, it might correspond to the icon matrix except for having one or more column and/or row of pixels removed. Alternatively, the matrix of the second type may be a version of the icon matrix with additional padding or whitespace, that is to say, it might correspond to the icon matrix except for having one or more additional column and/or row of pixels.

Alternatively, each of the first and second matrix might be derived separately from the icon matrix. For example, the first matrix and second matrix might each be scaled versions of the same icon matrix, having different scale factors, such that they have different sizes.

In various embodiments, the matrix of the second type comprises at least one additional or at least one less column than the matrices of the first type.

In various embodiments, the matrix of the second type comprises at least one additional or at least one less column than the matrices of the first type.

In various embodiments the second number is one.

A further aspect of the invention provides a method of designing a printed image in a security feature comprising dividing the printed image into a plurality of areas, and for a first area of the plurality of areas providing a first icon design associated with that area and providing a first desired magnification associated with that area; and designing the first area according to any of the methods disclosed above, wherein the icon matrix represents the first icon design and the desired magnification is the first desired magnification.

Advantageously, this allows for a specific area of the security feature to provide the visual effect of magnification, whilst other areas might provide different visual effects. In particular, because the method of providing the effect of magnification does not rely on, for example, a rotation of the micro optic element array with respect to the printed image, the visual effect which is provided across the security feature, is not restricted by the difference in pitch being dictated (at least in part) by the angular offset between the micro-optical element array and the printed image as is the case for such moiré magnifiers of the prior art. For example, areas having differently signed and high magnitude magnifications can be provided across the security feature. Generally, employing the method of the present invention, it is possible to provide near any combination of magnifications across image. In various embodiments, this allows for security feature designs in which different optical effects within the security feature enhance its visual distinctiveness, thereby improving its effectiveness as a readily identifiable authenticating security feature.

In one embodiment, the method further comprises, for a second area of the plurality of areas: providing a second icon design associated with a second area of the plurality of areas and providing a second desired magnification associated with the second area; and designing the second area according to the method of any preceding claim, wherein the icon matrix represents the second icon design and the desired magnification is the second desired magnification, wherein the second desired magnification is different to the first desired magnification, wherein the modal matrix size in the first area is the same as the modal matrix size in the second area.

Advantageously, this allows for different areas of the security feature to provide different degrees of magnification.

In one embodiment, the second icon design is different to the first icon design.

Advantageously, this allows for different icon designs to be provided in different areas of the security feature, each associated with different degrees of magnification.

In various embodiments, the method further comprises providing in a further area of the plurality of areas an area corresponding to a static design element, wherein the size of the static design element relative to the optical elements results in the pixels under each optical element in the security feature in the area corresponding to the static design element being substantially uniform.

Advantageously, this allows for both magnified areas and non-magnified static areas to be provided within the security feature.

In various embodiments, the method further comprises providing in a further area of the plurality of areas an area corresponding to an animated design element, wherein, in the area corresponding to the animated design element, the printed image is designed such that each lens overlays a matrix of pixels, each pixel associated with a particular frame of animation in a series of frames of animation.

Advantageously, this allows for both magnified areas and non-magnified animated areas to be provided within the security feature.

A further aspect of the invention provides a method of producing a security feature comprising printing a printed image designed in accordance with any of the methods described above.

In one embodiment the method further comprises placing an array of optical elements over the printed image, wherein each optical element is substantially the same size as the modal matrix.

A further aspect of the present invention provides a printed image for a security feature, the security feature comprising an array of optical elements overlaying the printed image, wherein at least one area of the printed image comprises an array of two dimensional matrices of pixels comprising a sequence of repeated sets, wherein each set comprises a first number of matrices of a first type having a first size and a second number of matrices of a second type having a second size, wherein the matrix of the first type and the matrix of the second type are based on an icon matrix comprising rows and columns of pixels having pixel values representing an icon to be viewed by a user of the security feature, and wherein the first number, second number, first size, and second size are selected such that the mean size of each matrix within the set deviates from the modal matrix size by a desired gap size to provide a desired magnification of the icon when the printed image is viewed through the array of optical elements.

A further aspect of the present invention provides a security feature comprising the printed image and an array of identical optical elements overlaying the printed image.

A further aspect of the invention provides a security document comprising the security feature.

A further aspect of the invention provides a non-transitory computer readable medium, storing computer readable instructions which, when executed, cause a machine comprising a processor to perform any of the methods described above.

DETAILED DESCRIPTION

Certain exemplary embodiments will now be described to provide an overall understanding of the principles of the structure, function, manufacture, and use of the devices, systems, and methods disclosed herein. One or more examples of these embodiments are illustrated in the accompanying drawings. A person skilled in the art will understand that the devices, systems, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Moiré Magnification Through Modification of Icon Matrix Size

In one embodiment, the present invention provides a method for designing a printed image for use in a security feature. The method relies on designing the printed image of the security feature to have an effective pitch which is not dictated by a physical separation of the icons or a rotation of the micro-optic array relative to the icons but, instead, is dictated by providing a printed image which comprises repeating sets of icons, each set comprising icons of slightly differing sizes. This provides an effective difference in icon pitch compared to the lens pitch.

Figure 1A:
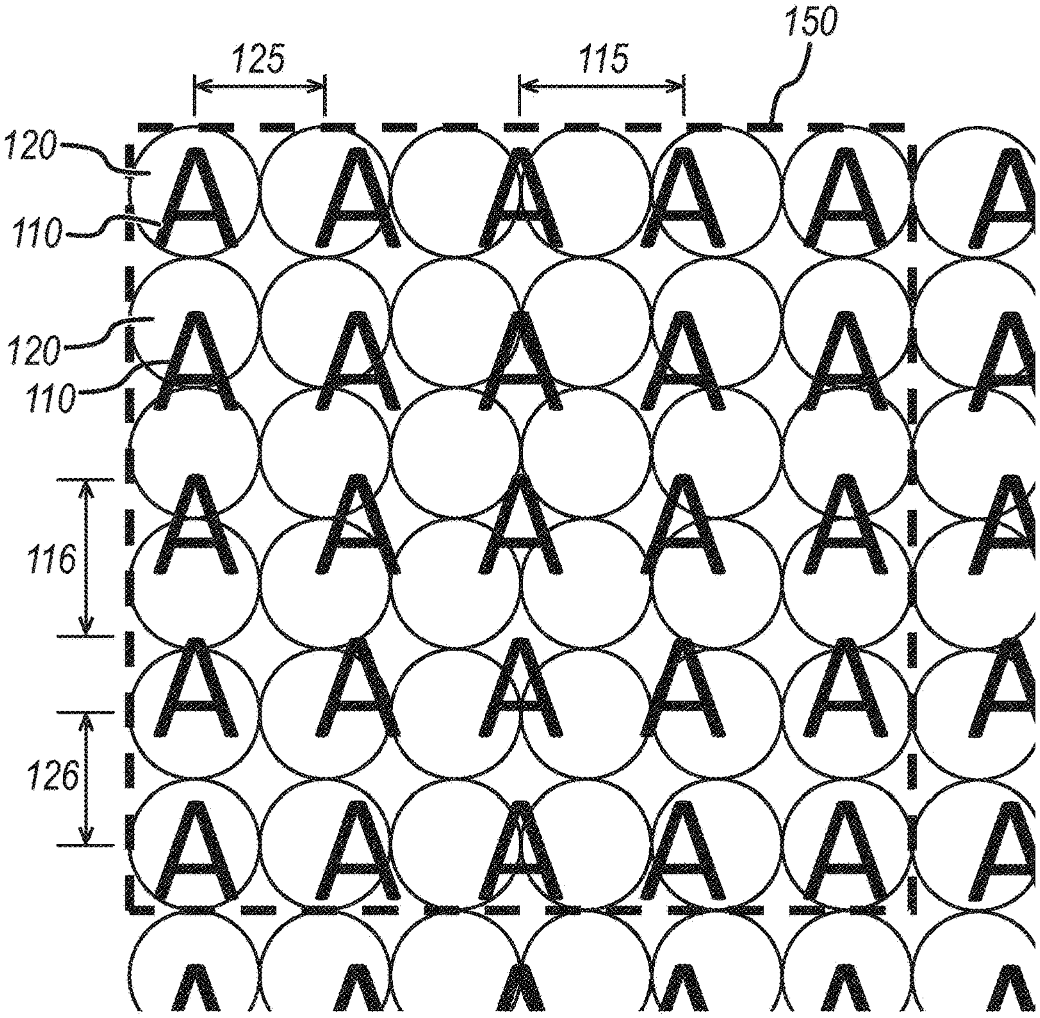
FIGS. 1A and 1B show a moiré magnifier of the prior art.
Figure 1B:
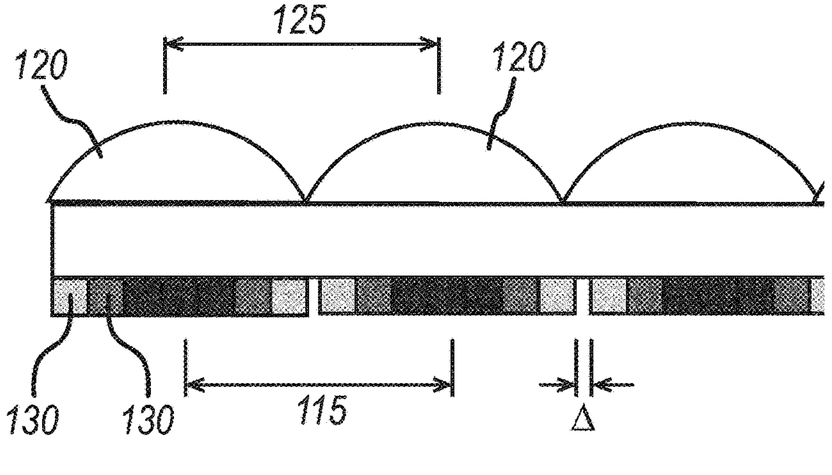
Figure 1C:
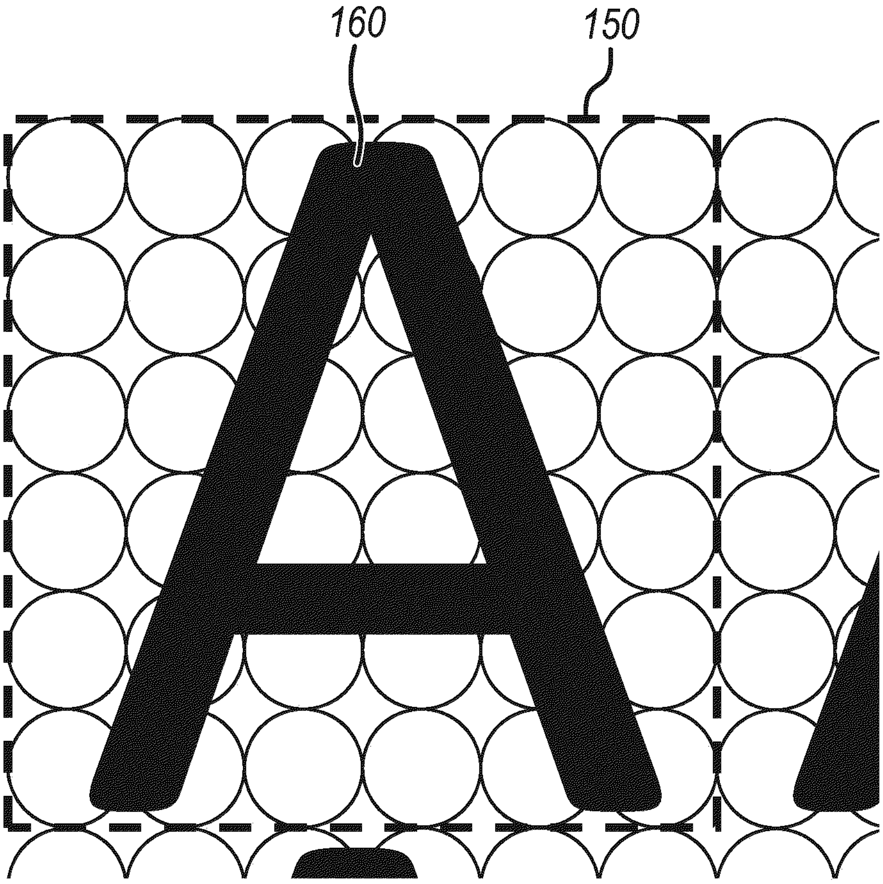
FIG. 1C shows the apparent magnification of the icon in the moiré magnifier of FIGS. 1A and 1B.
Figure 2:
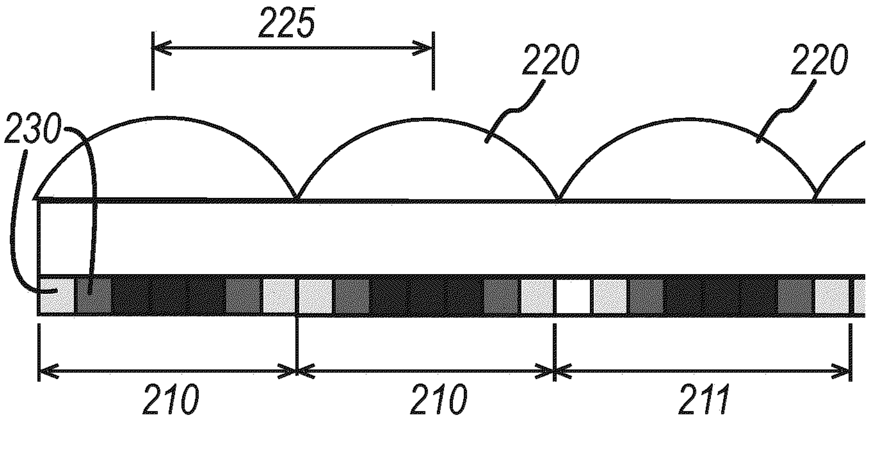
FIG. 2 shows a security feature of the present invention.

The present invention can be appreciated from FIG. 2 which shows a cross-sectional view of a series of printed icons 210, 211, beneath a series of microlenses 220 spaced at a pitch 225. It will be appreciated that each icon 210, 211 is made up of a number of pixels 230. It will further be appreciated that each icon is a two-dimensional matrix of pixels, with only one dimension illustrated in FIG. 2 for ease of understanding. In the security feature of the present invention the number of pixels 230 is varied between matrices associated with particular icons 210, 211. For example, it can be seen that the matrix of icon 211 has one more pixel than the matrix of icon 210. In this way, the matrices corresponding to the icons vary in size and an effective difference in icon pitch compared to the lens pitch can be provided.

Each icon is designed as a two dimensional matrix of pixels. The number of pixels in the design of the icon dictates the size of the icon once printed. For example, if an icon is designed as an icon matrix of 28×28 pixels, and each pixel is printed as a 2.5 μm square, the resultant icon will be 70 μm in size.

Rather than providing an array of identically sized icon matrices, in the present invention, the printed image is designed as an array of repeated sets of matrices. Each set includes a number of matrices which correspond to the icon matrix (in the above example, being 28 pixels wide), and at least one matrix which is a different size to the icon matrix. In this way, the mean size of the matrices differs from the size of the icon matrix (which will be the modal size of the matrices). By design, the modal size of the matrices will correspond to the pitch of the optical elements within the array. The mean size of the matrices will dictate the effective pitch of the icons within the printed image. In comparison to the printed image design of the prior art described in the Background section above, once printed, the mean matrix size in the present invention will be equivalent to the icon pitch, whilst the modal matrix size in the present invention will be equivalent to the icon size. That is to say, the difference between the modal printed matrix size and mean printed matrix size will be equivalent to the quantity Δ in the calculation of magnification $M=P_l/\Delta$.

Taking the above example, the array of matrices may be grouped into sets of three matrices, two of which are designed as the icon matrix (i.e. 28 pixels wide) whilst the third is an additional pixel in width, to give the following sequence:

. . . , 28, 28, 29, 28, 28, 29, . . . .

The mean width of the icons across the matrices across the array is in this case 28.33 pixels. Once printed, at 2.5 μm per pixel, this corresponds to a mean matrix size of 70.83 μm, whilst the modal matrix size, or icon matrix size, is 70 μm. By design, the modal matrix size corresponds to the pitch of the lens elements in the overlaying lens array.

As a result, the effective pitch of the array of icons differs from the pitch of the lens elements by 0.83 μm. This gives rise to a magnification of $M=P_l/\Delta=+84\times$. This will give the visual effect of the icon being magnified to 84 times its original size and being disposed on a plane which recedes from the viewer compared to the plane of the security feature itself.

It will be appreciated that the second matrix type might have one less pixel than the icon matrix (rather than one additional pixel) such that the mean matrix size and, therefore, the effective pitch of the array of icons is smaller than the pitch of the lens elements. In such a case, the sign of the magnification would be reversed, giving the visual effect of a plane approaching the viewer.

It will be appreciated that whilst the example above has been described with reference to the addition or omission of columns of pixels from matrices, in some embodiments rows of pixels are added or omitted. In other embodiments, both rows and columns are omitted.

The pixel values for the matrix of the first type and the matrix of the second type can be determined in various ways. For example, the pixel values of the matrix of the second type might correspond to an image which is a scaled version of the icon matrix, being either larger or smaller than the icon matrix. Alternatively, the matrix of the second type may be a cropped version of the icon matrix, that is to say, it might correspond to the icon matrix except for having one or more column and/or row of pixels removed.

Alternatively, the matrix of the second type may be a version of the icon matrix with additional padding or whitespace, that is to say, it might correspond to the icon matrix except for having one or more additional column and/or row of pixels.

Alternatively, rather than the first matrix type being the icon matrix, each of the first and second matrix might be derived separately from an icon matrix design. For example, the first matrix and second matrix might each be scaled versions of the same icon matrix, having different scale factors, such that they have different sizes.

In contrast to security features of the prior art, the effective difference between icon pitch and lens pitch is no longer dictated by the minimum print resolution; it is, instead, dictated by the mean matrix size within a repeated sequence, which may include a larger number of icon matrices, further reducing the difference between the mean matrix size and the modal matrix size.

Moreover, because the effective difference between icon pitch and lens pitch is achieved through the printed design, rather than through a difference in orientation between the printed image and the lens array, a different effective pitch difference (and hence different magnification effect) can be provided in different areas of the security feature.

In security features, it is desirable to provide distinctive and complex visual effects. A more distinctive visual effect is more easily recognisable by a viewer of the security device to ascertain whether a given document is authentic. The more complex the visual effect, the more difficult it may be to produce a counterfeit copy of the security feature.

Security Features Exhibiting Different Magnifications within Design

As discussed above, by way of the method described above, a security feature can be designed such that different areas across the image can have different effective degrees of magnification. In one aspect of the present invention, a printed image can be designed such that different areas of the security feature exhibit different degrees of apparent magnification. Because of this, it is possible to provide particularly distinctive and complex visual designs.

Figure 3A:
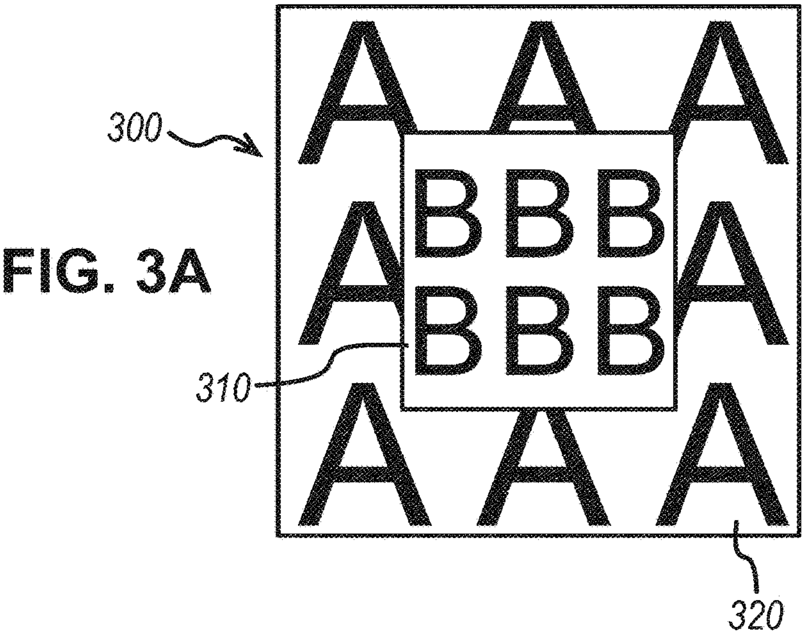
FIGS. 3A to 3C show the visual effect provided by a security feature in one embodiment of the present invention which includes areas having different degrees of apparent magnification.
Figure 3B:
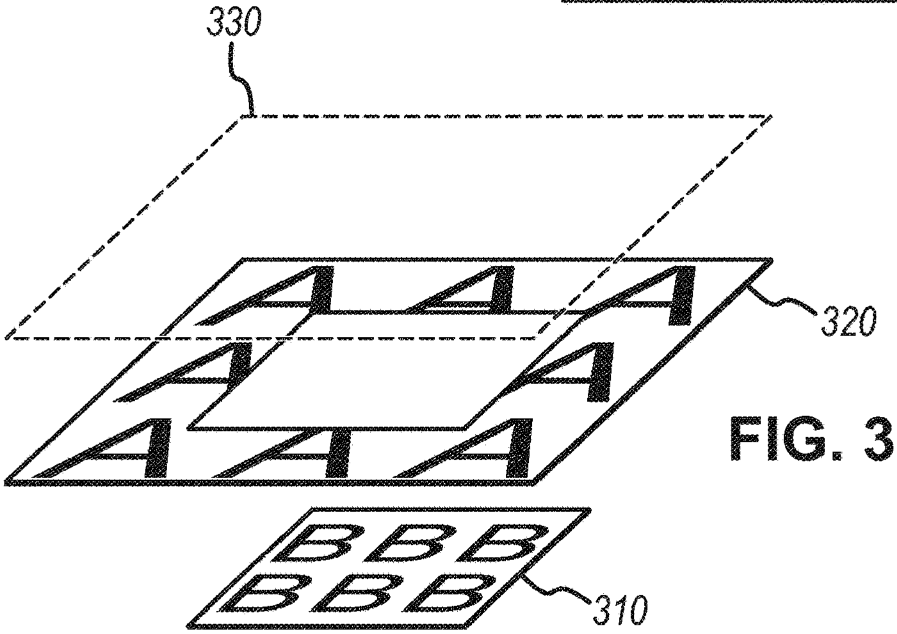
Figure 3C:
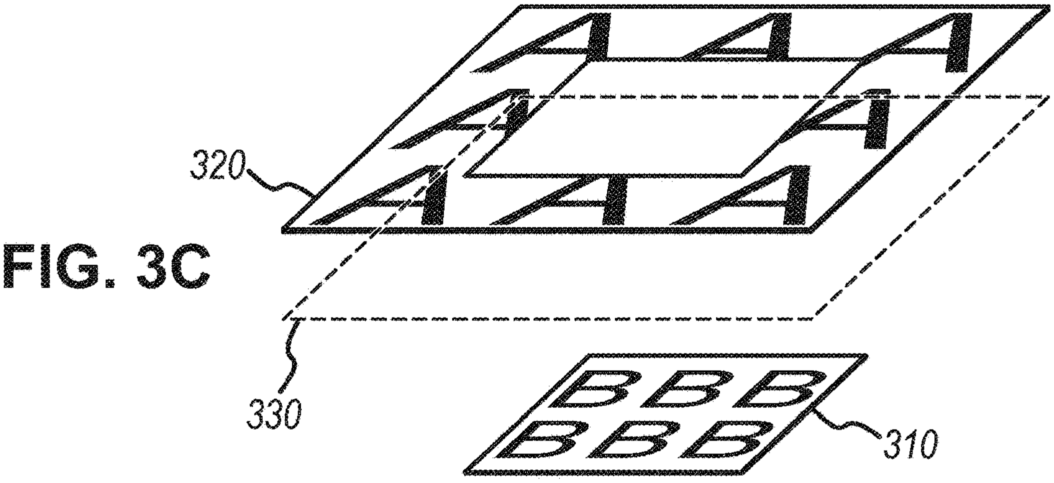

For example, with reference to FIGS. 3A to 3C, the design 300 might be separated into a first, central, portion 310 surrounded by a second, frame, portion 320. By way of a first example which is illustrated in FIG. 3B, the central portion 310 might have a first design having a 'positive' signed magnification (in the convention above), thereby appearing as a plane which recedes from the viewer, i.e. appearing to be 'behind' the plane of the security feature. The frame portion 320 might have a 'positive' signed, but smaller, magnification than the central portion such that it appears to be on a plane which is receding from the viewer but at a depth which is closer to the plane of the security device than the central portion. In this way, the frame portion appears to float 'above' the central portion.

By way of a further example which is shown in FIG. 3C, the second portion might be designed to have a differently signed magnification than the first portion. For example, the frame portion might be designed to have a 'negative' signed magnification and therefore appear on a plane which approaches the viewer, i.e. appearing to be 'above' the plane of the security feature.

Figure 4A:
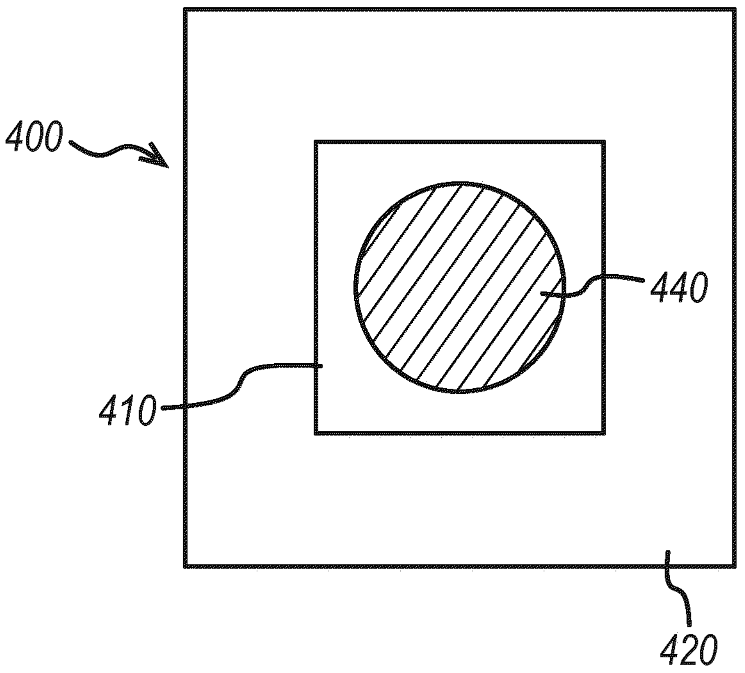
FIGS. 4A and 4B show the visual effect provided by a security feature in another embodiment of the present invention having both magnified and non-magnified regions.
Figure 4B:
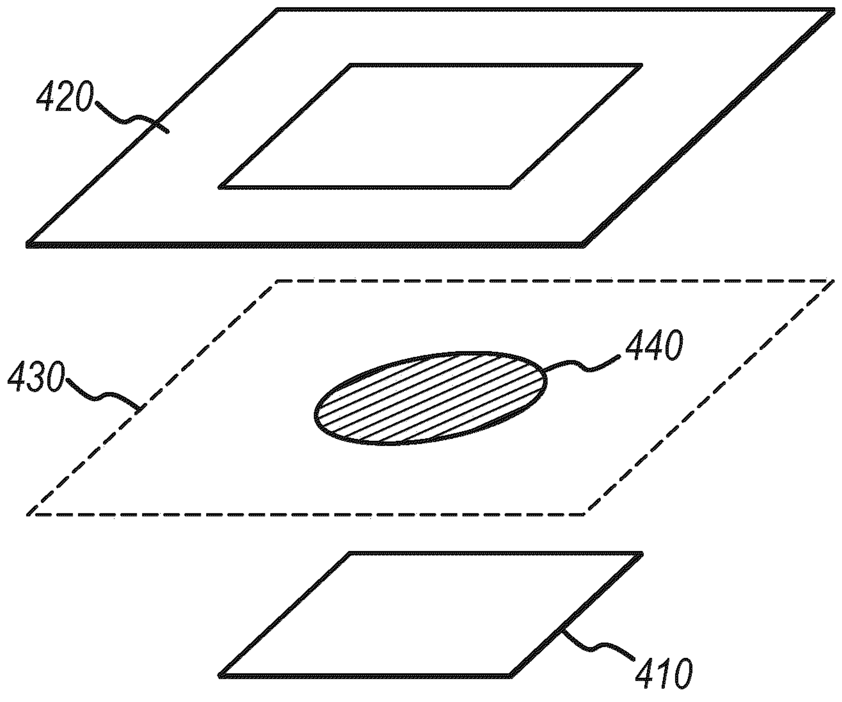

By way of another example which is shown in FIG. 4, the design can be further augmented by printing portions of the image which appear to have no magnification at all and therefore appear to lie in the plane of the security feature itself. As illustrated, the design 400 may comprise a first, central, portion 410 with a positively signed magnification such that it appears to be on a plane which is receding from the viewer. This is surrounded by a second, frame, portion 420 which has a 'negative' signed magnification and therefore appears on a plane which approaches the viewer. A third portion 440 is designed to have no apparent magnification at all and will therefore appear to lie on the plane 430 of the security feature itself, between the plane of the first portion 410 and second portion 420.

One way to provide a portion 440 with no apparent magnification is to design the printed image as a design feature which is large compared to the microlenses. In the above example, non-magnified portion 440 is a macro-scale circular design in the centre of the image. Because the design is large compared to the microlenses, the pixels under each microlens will be substantially uniform (i.e. substantially all pixels under a microlens will have substantially the same pixel value) and therefore the appearance of the image at that microclens will not appear to change as the viewing angle is changed. Accordingly, the non-magnified portion will appear as a stationary image at the plane 430 of the security device.

A further way in which such a design can be augmented is by designing the printed image to have portions which give rise to an animated object lying at the plane of the security feature. With reference again to FIG. 4, this can be achieved by designing the printed image such that the area 440 of the printed image that corresponds to the non-magnified part of the design provides a non-magnified animated design. In this case, within the area 440, the pixels below each lens each correspond to different 'frames' of an animation, where the pixels of different frames of an animation are interlaced underneath a lens. That is to say, the non-magnified part of the design extends over a number of lenses, and under each lens the matrix might be, for example, a 28×28 matrix of pixels. This might be notionally divided into a 14×14 matrix of 'design' pixels (i.e. each pixel is double the height and width of the print pixels). The non-magnified part of the design is designed such that it has 14×14=196 frames of animation. For each frame of the animation, each lens will be associated with a particular pixel value, that pixel value being assigned to the corresponding frame pixel under that lens. In this way, pixel values of images corresponding to the different frames of animation are interlaced across the area of the design corresponding to the animated object.

Thus, as the user views this part of the security feature from different angles, a different set of the interlaced pixels will be viewed, with those pixels corresponding to a particular frame of the animation. For example, depending on the frame of the animation, the non-magnified part of the design might display a different colour to the user, such that as the user changes the angle at which they view the design, the non-magnified part of the design cycles through different colours. Alternatively, each frame may be a frame of a simple motion animation to give the appearance that the non-magnified portion of the image is in motion as the security feature is tilted.

Methods of Producing a Printed Image, a Security Feature, or a Security Document In another embodiment, there is disclosed a method of producing a printed image in a security feature comprising: designing the printed image in the security feature according to any of the methods detailed herein; and fabricating the security feature.

To fabricate the security feature, typically the image will be printed. An array of micro-optical elements (such as microlenses) will be overlaid onto the printed image. Alternatively, the image may be printed on to the back side of a substrate, on the front side of which is the array of micro-optical elements. Further alternatively, the printed image might be printed through the micro-optical array using a laser printing process. Further alternatively, the security feature might be fabricated by embossing features into the back side of a substrate, and filling those features with ink so as to provide the printed image.

In another embodiment, there is disclosed a security feature comprising a printed image, wherein the printed image is designed according to any of the methods detailed herein. In some embodiments, the security feature may further comprise an array of optical elements. In another embodiment, a security document may comprise the security feature disclosed herein. In some embodiments the security document may be a banknote. In other embodiments the security document may be any of a passport, a driver's license, ID card, or other governmental document.

Computer Readable Instructions

In another embodiment, there is disclosed a non-transitory computer readable medium, storing computer readable instructions, which when executed, cause a machine comprising a processor to perform any of the methods disclosed herein.

The invention claimed is:

1. A method of designing at least an area of a printed image in a security feature, the security feature comprising an array of optical elements overlaying the printed image, the method comprising:

designing an icon matrix comprising rows and columns of pixels having pixel values, the icon matrix representing an icon to be viewed by a user of the security feature;

determining a desired gap size to provide a desired magnification of the icon, wherein the desired magnification is equal to an icon matrix size once printed divided by the desired gap size;

generating an array of two dimensional matrices of pixels, wherein the array of two dimensional matrices of pixels comprises a sequence of repeated sets of matrices, wherein each set comprises a first number of matrices of a first type having a first size and a second number of matrices of a second type having a second size, wherein a matrix of the first type and a matrix of the second type are based on the icon matrix, wherein the matrix of the first type corresponds to the icon matrix, and wherein the first number, second number, first size, and second size are selected such that, a mean size of each matrix within the set deviates from a modal matrix size by the desired gap size, wherein a pitch of the array of optical elements is equal to the modal matrix size, and wherein the matrix of a second type comprises at least one additional column than the matrices of a first type, or wherein the matrix of a second type comprises at least one less column than the matrices of a first type.

2. The method of claim 1, wherein the step of determining a desired gap dimension comprises:

calculating a gap size which would cause the desired magnification upon an array of repeated matrices corresponding to the icon matrix when the repeated matrices are spaced apart by said gap size and viewed via the array of optical elements.

3. The method of claim 1, wherein the matrix of a second type comprises at least one additional row than the matrices of a first type.

4. The method of claim 1, wherein the matrix of a second type comprises at least one less row than the matrices of a first type.

5. The method of claim 1, wherein the second number is one.

6. The method of claim 1, wherein the matrices of the first type are identical.

7. A method of designing a printed image in a security feature comprising:

dividing the printed image into a plurality of areas, and for a first area of the plurality of areas:

providing a first icon design associated with that area and providing a first desired magnification associated with that area; and designing the first area according to the method of claim 1, wherein the icon matrix represents the first icon design and the desired magnification is the first desired magnification.

8. The method of claim 7, further comprising:

providing in a further area of the plurality of areas an area corresponding to a static design element, wherein a size of the static design element relative to the optical elements results in the pixels under each optical element in the security feature in the area corresponding to the static design element being substantially uniform.

9. The method of claim 7, further comprising:

providing in a further area of the plurality of areas an area corresponding to an animated design element, wherein, in the area corresponding to the animated design element, the printed image is designed such that each lens overlays a matrix of pixels, each pixel being associated with a particular frame of animation in a series of frames of animation.

10. A method of designing a printed image in a security feature comprising:

dividing the printed image into a plurality of areas, and for a first area of the plurality of areas:

providing a first icon design associated with that area and providing a first desired magnification associated with that area; and for a second area of the plurality of areas:

providing a second icon design associated with a second area of the plurality of areas and providing a second desired magnification associated with the second area; and designing the first area and the second area according to the method of claim 1, wherein an icon matrix for the first area represents the first icon design and the desired magnification is the first desired magnification and wherein an icon matrix for the second area represents the second icon design and the desired magnification is the second desired magnification, wherein the second desired magnification is different from the first desired magnification, wherein a modal matrix size in the first area is the same as a modal matrix size in the second area.

11. The method of claim 10, wherein the second icon design is different from the first icon design.

12. A method of producing a security feature comprising:

printing a printed image designed in accordance with claim 1.

13. The method of claim 12, further comprising:

placing an array of optical elements over the printed image, wherein each optical element is substantially the same size as the modal matrix.

14. A non-transitory computer readable medium, storing computer readable instructions, which, when executed, cause a machine comprising a processor to perform the method of claim 1.

15. A printed image for a security feature, the security feature comprising an array of optical elements overlaying the printed image, wherein at least one area of the printed image comprises an array of two dimensional matrices of pixels comprising a sequence of repeated sets, wherein each set comprises a first number of matrices of a first type having a first size and a second number of matrices of a second type having a second size, wherein a matrix of the first type and a matrix of the second type are based on an icon matrix comprising rows and columns of pixels having pixel values, the icon matrix representing an icon to be viewed by a user of the security feature, wherein the matrix of the first type corresponds to the icon matrix, and wherein the first number, second number, first size, and second size are selected such that a mean size of each matrix within the set deviates from a modal matrix size by a desired gap size to provide a desired magnification of the icon when the printed image is viewed through the array of optical elements, wherein the desired magnification is equal to an icon matrix size once printed divided by the desired gap size, wherein a pitch of the array of optical elements is equal to the modal matrix size, and wherein the matrix of a second type comprises at least one additional column than the matrices of a first type, or wherein the matrix of a second type comprises at least one less column than the matrices of a first type.

16. The printed image of claim 15, wherein the matrix of a second type comprises at least one additional row than the matrices of a first type.

17. The printed image of claim 15, wherein the matrix of a second type comprises at least one less row than the matrices of a first type.

18. The printed image of claim 15, wherein the second number is one.

19. The printed image of claim 15, wherein the matrices of the first type are identical.

20. The printed image of claim 15, wherein the image comprises a plurality of areas, the at least one area being a first area of the plurality of areas, wherein the icon matrix in the first area is a first icon matrix and a desired magnification in the first area is a first desired magnification.

21. The printed image of claim 20, wherein the plurality of areas comprises a second area, wherein the icon matrix in the second area is a second icon matrix and a desired magnification in the second area is a second desired magnification, wherein a modal matrix size in the second area is the same as a modal matrix size in the first area.

22. The printed image of claim 21, wherein a second icon design is different from a first icon design.

23. The printed image of claim 20, further comprising an area corresponding to a static design element, wherein a size of the static design element relative to the optical elements results in the pixels under each optical element in the security feature in the area corresponding to the static design element being substantially uniform.

24. The printed image of claim 20, further comprising an area corresponding to an animated design element, wherein, in the area corresponding to the animated design element, the printed image is designed such that each lens overlays a matrix of pixels, each pixel being associated with a particular frame of animation in a series of frames of animation.

25. A security feature comprising:

the printed image of claim 15; and an array of identical optical elements overlaying the printed image.

26. A security document comprising the security feature of claim 25.

27. The security document of claim 26, wherein the security document is one of a banknote, a passport, a driver's license, and an identification card.

* * * * *